July 8, 1947.  W. H. CLARK  2,423,483
CABLE TENSION REGULATOR
Filed Oct. 14, 1944   5 Sheets-Sheet 2

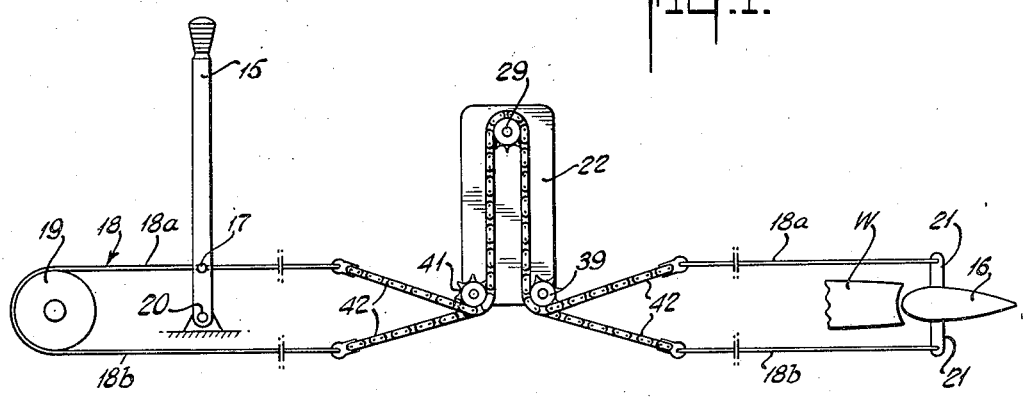
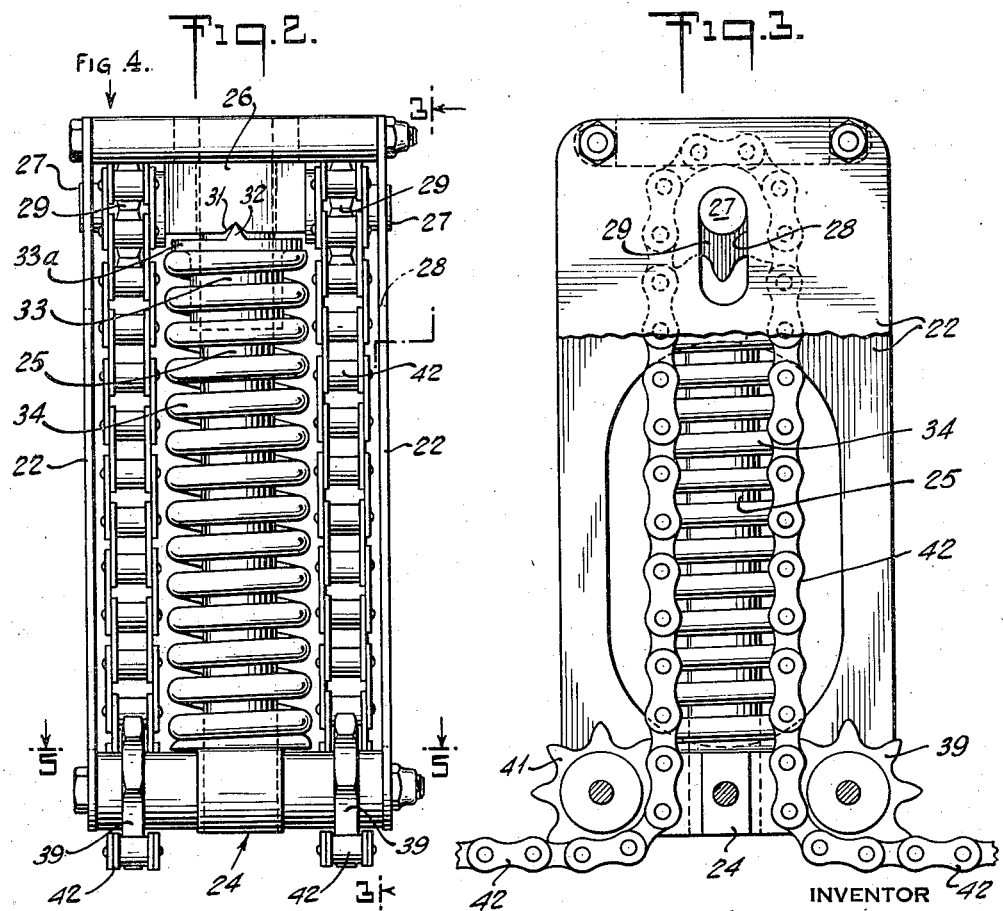

INVENTOR
WARREN H. CLARK.
BY C. B. Stevens
ATTORNEY

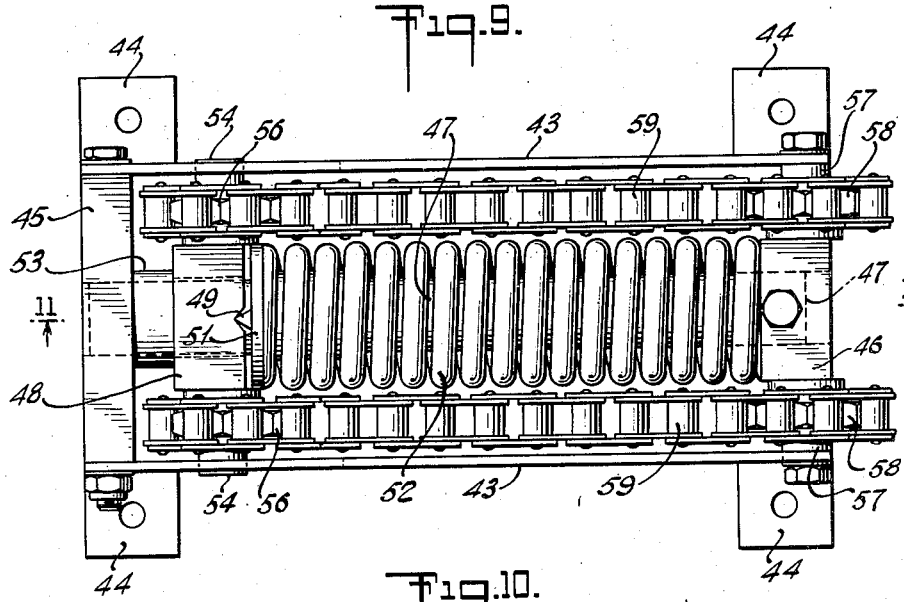
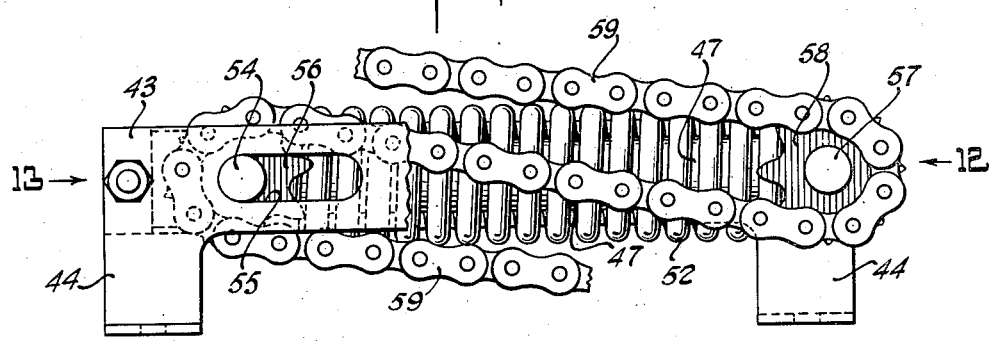
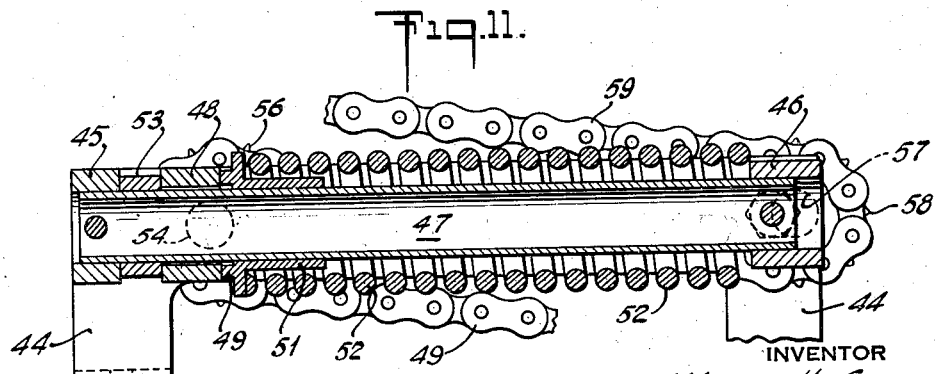

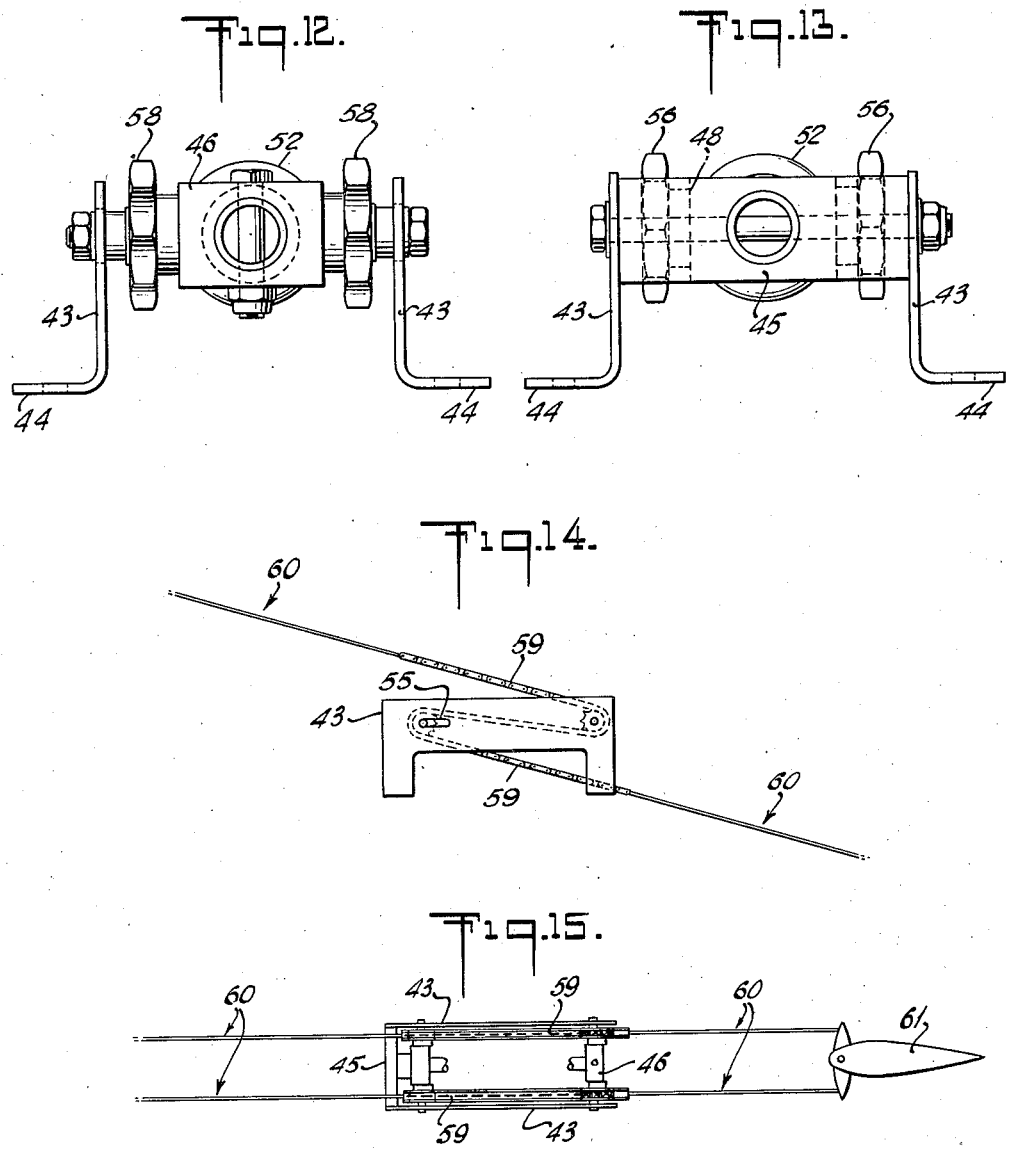

July 8, 1947.    W. H. CLARK    2,423,483
CABLE TENSION REGULATOR
Filed Oct. 14, 1944    5 Sheets-Sheet 5

INVENTOR
WARREN H. CLARK.
BY C.B. Stevens
ATTORNEY

Patented July 8, 1947

2,423,483

UNITED STATES PATENT OFFICE 2,423,483

CABLE TENSION REGULATOR

Warren H. Clark, Glendale, Calif., assignor to United Aircraft Products, Inc., Dayton, Ohio, a corporation of Ohio Application October 14, 1944, Serial No. 558,699

3 Claims. (Cl. 74—501)

This invention relates to tension regulating apparatus for use in parallel cable assemblies, particularly the control cables of aircraft.

In aircraft, cables are stretched between controls in the pilot's compartment and remote parts controlled thereby, such as wing flaps and elements of the tail assembly, and are rigged under an initial tension predetermined to provide a connection substantially free of lost motion. By reason of changes in air temperature the cables tend to lose their initial tension since the rate of expansion and contraction of the cables under conditions of heat and cold differs from that of the aircraft body. Cable tension regulators customarily are provided for compensating for changes in initial tension due to temperature variation, and the present invention relates to that class of regulator which interposes a yield in a pair of parallel cable lines and which automatically removes the yield when a control load is applied to either one of the lines.

An object of the invention is to obtain a small compact regulator unit which may be installed anywhere in a cable assembly, and which is capable of operation under loads relatively high for its size and weight.

Another object is to eliminate auxiliary locking mechanisms from the unit by imparting a self-locking characteristic to the tension compensating means thereof.

A further object is to obtain a regulator unit the principles of construction of which may be adapted to different forms, including an embodiment in which the unit is an integral part of linkage for operating aircraft control surfaces.

Other objects and structural details of the invention will appear from the following description when read in connection with the accompanying drawings, wherein:

Fig. 1 is a diagrammatic view showing a first form of cable tension regulator incorporated in a system for the remote operation of an aircraft control surface;

Fig. 2 is a view of the regulator of Fig. 1 in front elevation;

Fig. 3 is a view of the regulator of Fig. 1 in side elevation, with a part of the side frame broken away, as indicated by the line 3—3 of Fig. 2;

Fig. 9 is a view in front elevation of a second form of cable tension regulator;

Fig. 10 is a view in side elevation of the regulator of Fig. 9;

Fig. 11 is a view in longitudinal section taken along the line 11—11 of Fig. 9;

Figs. 12 and 13 are views of the opposite ends of the regulator of Fig. 9;

Figs. 14 and 15 are diagrams showing the manner of use of the regulator of Fig. 9 in a cable control system;

Figure 4:
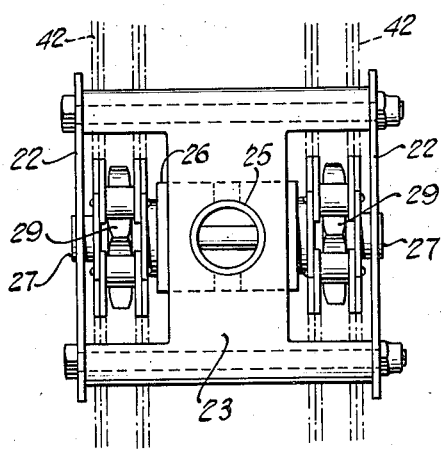
Fig. 4 is a top plan view of the regulator of Fig. 1.

In that form of the invention shown in Fig. 1 the cable tension regulator is interposed in a line connecting a pilot operated lever or "stick" 15 with a movable control surface 16 which may be located in the wing or tail assembly of the aircraft, and conveniently pivoted at its ends. The lever 15 is pivotally mounted at 20 to the aircraft body and is connected at 17 to a cable 18. The cable 18 is passed around a pulley 19 and has its terminals connected to oppositely projecting arms 21 integral with or otherwise rigidly secured to the control surface 16. In extending from one arm 21 to the pulley 19 and back to the other arm 21 the cable 18 follows adjacent parallel paths. It will be observed that motion of the lever 15 in a leftward or rightward direction about the pivot 16 serves to effect opposite directions of motion of the cable 18 whereby to rock the control surface 16 relatively to a wing W, or the like, of which it forms a part. Considering the parallel portions of the cable 18 as comprising separate lines 18a and 18b it will be seen that leftward or forward motion of the lever 15 increases the tension on cable line 18a while relieving the tension on line 18b. Accordingly, the direction of motion of surface 16 is counterclockwise as viewed in Fig. 1. In response to a rightward or rearward motion of the lever 15 the tension of line 18b is increased and that of line 18a is decreased, with the result that control surface 16 moves in a clockwise direction. In the installation of the system the cable 18 is rigged to an initial tension substantially eliminating lost motion in the connection between operating lever 15 and control surface 16. As a consequence of wear, however, and of variations in climatic conditions the initial tension of the cable may change in a manner causing undesirable looseness or tautness in the system.

Figure 7:
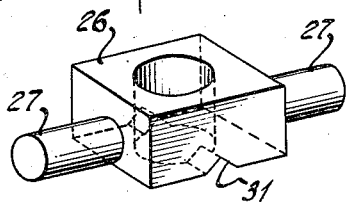
Fig. 7 is a detail view in perspective of a sliding block forming part of the regulator of Fig. 1.
Figure 8:
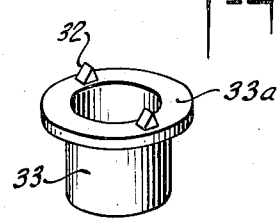
Fig. 8 is a detail view in perspective of a sleeve constituting a mount for the sliding block of Fig. 7.
Figure 16:
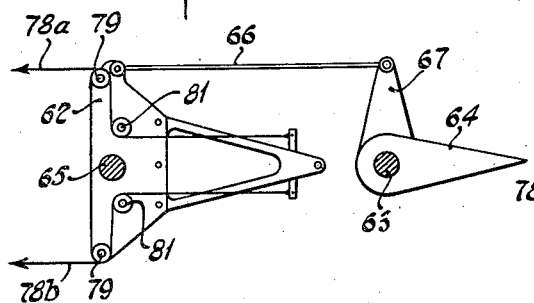
Fig. 16 is a diagrammatic view showing a third form of cable tension regulator as it is incorporated in linkage for operating an aircraft control surface.
Figure 17:
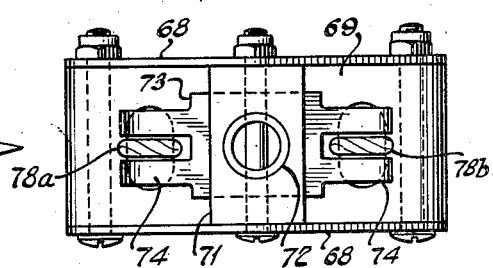
Fig. 17 is an end view of the cable tension regulator of Fig. 16.
Figure 18:
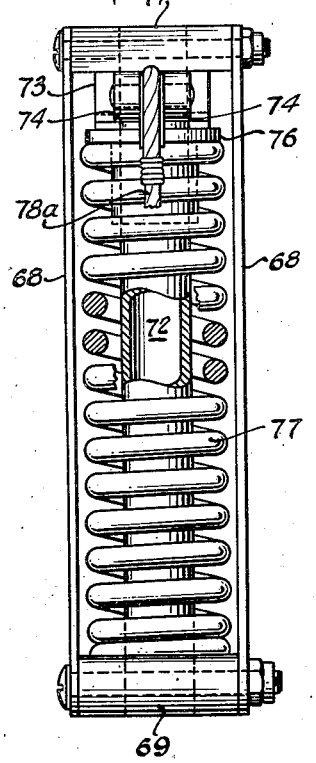
Fig. 18 is a view in front elevation of the regulator of Fig. 16, partly broken away.
Figure 19:
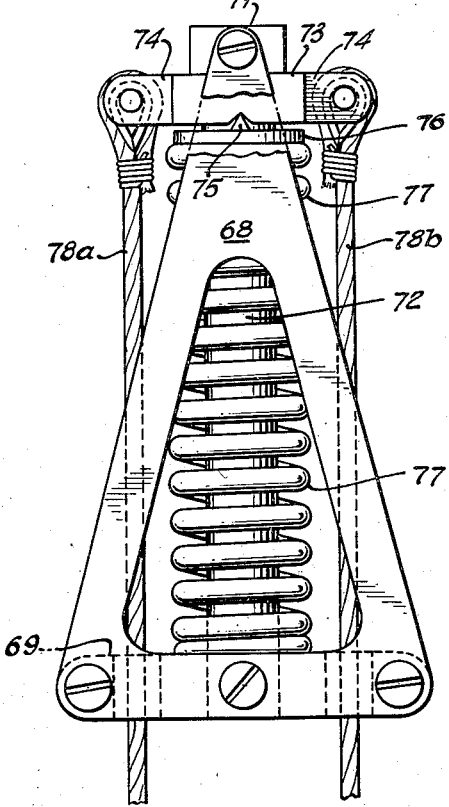
Fig. 19 is a view in side elevation of the regulator of Fig. 16.

As a means of compensating for factors tending to change the initial tension of the cable there is interposed in the system regulating means which makes automatic adjustments in the cable tension to the end of maintaining such tension at its predetermined value. In the present instance the regulating means takes the form of a unit comprised of a pair of upstanding side frames 22 (see also Figs. 2 and 3) which are held in spaced relation by upper and lower plate members 23 and 24. The regulating unit is adapted to be attached to fixed brackets on the aircraft and is further comprised of a shaft 25 which extends vertically between the end members 23 and 24. Slidably mounted on the shaft 25 is a block 26 (see also Fig. 7) formed with a central opening therein and with oppositely disposed trunnions 27. The trunnions 27 extend through guide slots 28 in frames 22 and have mounted thereon, inside the side frames, sprocket wheels 29. The lower surface of the block 26 is formed with diametrically opposed grooves 31 adapted to receive complementary knife-edged lugs 32 formed on a sleeve 33 (Fig. 8) which surrounds shaft 25 between block 26 and end plate 24. A coil spring 34 surrounds the shaft 25, one end of the spring being based on plate 24 and the other end being engaged with an annular flange 33a on sleeve 33. Acting through the sleeve 33 the spring 34 presses the assembly comprising block 26, trunnions 27 and sprocket wheels 29 upward to engage the block with the lower surface of end plate 23. It will be observed that the lugs 32 perform the function of spacers between the block 26 and sleeve 33, permitting a rocking or tilting motion of the block on their knife-like edges.

Figure 5:
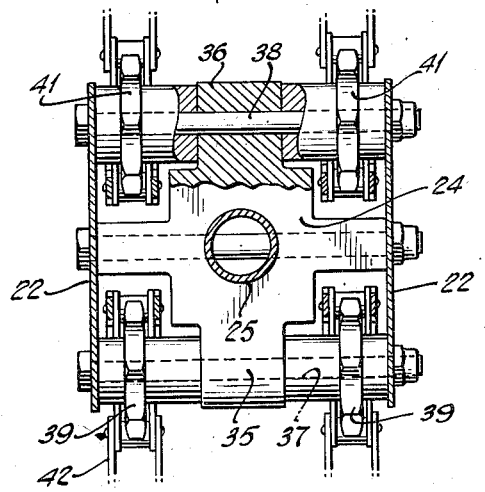
Fig. 5 is a view in cross section taken along the line 5—5 of Fig. 2.

Additional sets of sprocket wheels are supported by end plate 24. As seen in Fig. 5, the plate 24 is cut away to form projecting tongues 35 and 36 through which extend respective shafts 37 and 38 having their opposite ends mounted in side walls 22. Rotatably mounted on the respective shafts 37 and 38, inside the side walls 22, are sets of sprocket wheels 39 and 41. Adapted to pass over the sprocket wheels 29, 39 and 41 is a pair of chains 42. The chains 42 constitute a part of the cable assembly 18 and comprise continuations and extensions of the lines 18a and 18b of the assembly. For the purpose of interposing the cable tension regulator in the system cables 18a and 18b are severed and the adjacent ends of each connected by a respective chain 42. In assembling the regulator the chains 42 extending from the forward portions of the cables 18a and 18b are passed around respective sprocket wheels 41 at the base of the regulator and are then extended upward and around sprockets 29. From the latter wheels, the chains are returned downward and around sprockets 39 and thence out of the regulator for connection with the rearward portions of the cables. In response to the application of an initial tension to the cable assembly the chains 42 are tightened, and the sprocket wheels 29 and their mount 26 are drawn downward in the regulator against the force of spring 24 which thereby is placed under compression. Accordingly, if for any reason the cable lines tend to slacken from their initial tension the spring 34 will expand and restore the system to its original condition. Likewise, the spring provides a yield in the cable assembly preventing the imposition of excessive tension thereto.

Figure 6:
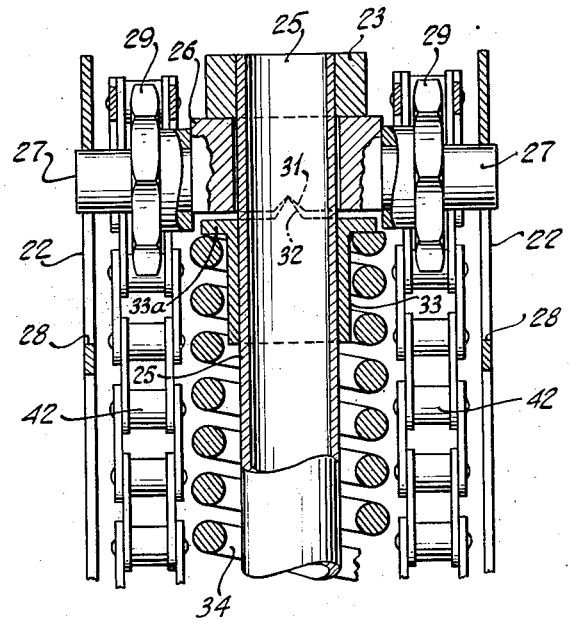
Fig. 6 is a fragmentary view in longitudinal section of the regulator of Fig. 1.

Since the separate lines 18a and 18b of the cable assembly are parallel and adjacent one another they are affected to the same degree by changes in temperature, and slacken and tighten to the same extent in response to such changes. Therefore, the pull exerted on the separate sprocket wheels 29 normally is approximately equal in force so that block 26 is allowed to slide evenly along shaft 25. When a control load is imposed on the system, as by actuation of lever 15, it is undesirable in the interests of sensitivity of response that there should be any yield in the system. For this reason means are provided for removing such yield. As may be seen in Fig. 6, the central bore through block 26 is somewhat greater in diameter than the outside diameter of shaft 25. Therefore, the block 26 and parts carried thereby may partake of a slight rocking motion with respect to shaft 25. Since the load applied by the cables on opposite sides of the block normally is equal no rocking motion thereof ordinarily takes place. However, when a control load is applied in the system one of the parallel cable lines tends to go slack, and the pull on the respective sprocket wheels 29 becomes unequal. The block 26 will tilt in response to such inequality, and, in so doing, become cocked on the shaft 25 in a manner preventing longitudinal motion along the shaft. The spring 34 then is ineffective or locked out. For the duration of the control operation the regulator functions as though the centers of rotation of the sprocket wheels 29 were fixed, and the connection between lever 15 and control surface 16 is substantially rigid and unyielding. When the loads on the parallel cables become equal again, the block 26 will straighten on the knife-edged lugs 32. The wedging action which locked the regulator thereby is relieved, and the spring 34 is free again to regulate the cable tension.

According to another form of the invention, illustrated in Figs. 9 to 15 inclusive, the regulator unit is comprised of side walls 43 having bent over portions 44 for attachment to the aircraft body. In this instance the regulator unit is arranged to lie substantially parallel with the cable assembly, the arrangement being such that only two sets of sprocket wheels are required in the unit. End plates 45 and 46 maintain the side walls 43 in spaced relation and provide a mounting for opposite ends of a shaft 47. Slidably mounted on the shaft 47 is a block 48 similar in construction to the block 26 of the first considered embodiment of the invention. The block 48 is engaged by knife-edged lugs 49 on a sleeve 51, and the assembly comprising the block and sleeve are pressed toward end plate 45 by a coil spring 52 surrounding shaft 47 and based on end plate 46. A spacer 53 between end plate 45 and block 48 limits movement of the block under influence of the spring. Trunnions 54 on block 48 are guided in slots 55 in side walls 43, and carry sprocket wheels 56. Extending transversely through the end plate 46 is a shaft 57 which provides a mount for a set of sprocket wheels 58 aligned with respective wheels 56. Engaged with and passed around the sets of sprocket wheels are chains 59 interposed in a cable assembly 60 adapted for the operation of a control surface 61. The chains 59 upon entering the regulator are passed around respective sprocket wheels 58 and are then directed to the opposite end of the regulator and passed around sprocket wheels 56 from whence they lead out of the unit toward control surface 61. The mode of operation of the regulator is the same as that described in connection with the Fig. 1 embodiment of the invention. Thus, the initial tension of the cable assembly places the spring 52 under compression thereby to obtain a yield in the assembly compensating for variations in tension caused by wear and by temperature changes. In the event of a control load on one of the cables the block 48 is permitted to rock on the knife-edged lugs 49 to a cocked position on shaft 47 and so render spring 52 ineffective.

A further embodiment of the invention appears in Figs. 16 to 19, where the regulator is seen incorporated in a bell-crank lever 62 for operating a shaft 63 to which may be fixed one or more control surfaces 64. The lever 62 is adapted to be pivotally mounted at 65 to a stationary part of the aircraft and is formed with oppositely extending arms to one of which is pivotally connected one end of a rod 66. The opposite end of the rod 66 is similarly attached to an arm 67 secured to the shaft 63. The control surface operating shaft 63 thus is rigidly connected to the lever 62 so that rocking motion of the lever about its pivot 65 causes a corresponding movement of the shaft.

The cable tension regulator is comprised in a pair of triangular side frames 68, the bases of which are secured to the lever 62. The frames 68 are held spaced apart by end plates 69 and 71 respectively at the base and apex of the frames. Extending between the end plates 69 and 71 is a shaft 72 on which is slidably mounted a block 73. The block 73 has a loose fit on the shaft 72 (in the manner of the corresponding blocks of the previously considered species) and is formed with oppositely extending tongue portions 74 adapted for the attachment of cable ends thereto. The undersurface of the block 73 is grooved for cooperation with knife-edged lugs 75 on a sleeve 76 slidably mounted on shaft 72 between the block 73 and base end plate 69. A coil spring 77 is interposed between the sleeve 76 and end plate 69 and acts through the sleeve to press the block 73 toward engagement with apex end plate 71. Parallel cable lines 78a and 78b enter the regulator unit by being passed around pulleys 79, carried by the oppositely disposed arms of the lever 62. Inwardly of the pulleys 79 the cable lines pass around a set of pulleys 81 and then extend through openings in regulator base plate 69. The terminals of the cable lines are attached to the tongue portions 74 of the block 73, and, when a tension load is on the cables, a force is exerted on the block in opposition to the spring 77. The initial tension of the cables is such as to place the spring 77 under compression. Then, as the cables stretch and contract in response to temperature changes, the variation in tension is compensated for by a further compression or expansion of the spring. When an operating load is applied to a cable 78a or 78b the normally equal tension of the cable lines is made unequal. The first result of such inequality is that the block 73 rocks on the shaft 72, and, becoming wedged thereon, removes from the system the yield represented by the spring 77. Continuation of the operating load applies a force through block 73 to the regulator assembly in a direction to turn lever 62 about its pivot 65. Rod 66, an arm 67 and shaft 63 partake of such movement and so change the position of control surface 64.

It will be observed that in the form of the invention shown in Figs. 16 to 19 the cables themselves are passed through the regulator, on pulleys, instead of utilizing an interposed chain and sprocket mechanism. Either method may be used in any of the disclosed species of the invention, chains being preferred when the small size of a unit makes difficult the use of pulleys of high load capacity.

What is claimed is:

1. In a cable tension regulator mounted for rotary movement about a fixed pivot; spaced end plates relatively fixed in said regulator; a shaft extending between said end plates; a block slidably mounted on said shaft and arranged for limited rocking motion relatively to the shaft; a coil spring surrounding said shaft and pressing said block toward one of said end plates; and oppositely extending tongues on said block forming attachment means for the terminals of parallel cable lines normally exerting approximately an equal pull on said block in opposition to the force of said spring, said cable lines and said spring cooperating to effect longitudinal adjustments of said block along said shaft in accordance with variation in cable tension and said cable lines acting in response to an increase in the tension load imposed on one of said cables over the other to rock said block in a manner wedging it on said shaft to render said spring ineffective and to permit rotary motion of the regulator under continued application of the increased tension load.

2. A cable tension regulator, comprising side frames, first and second end plates spacing said frames apart, spaced supports mounted in said first end plate, a pair of rotatable cable guides on each said spaced support, a shaft extending between said end plates, a block mounted on said shaft for relative longitudinal and tilting motions, a coil spring surrounding said shaft and based on said first end plate, said spring acting on said block to press it toward said second end plate, oppositely disposed slots in said side frames, trunnions on said block extending through said slots, the ends of said slots defining limits of movement for said block, and rotatable cable guides on said trunnions, a pair of control cables being adapted to be passed over a first one of said pairs of rotatable cable guides and over the rotatable cable guides on said block to and around the second one of said pairs of rotatable cable guides, said block acting in response to an inequality of load between said control cables to tilt and become wedged on said shaft whereby to permit said control cables to move around said rotatable guides without being subject to the yield provided by said spring.

3. A cable tension regulator, comprising side frames, first and second end plates spacing said frames apart, rotatable cable guides supported from said first end plate, a shaft extending between said end plates, a block mounted on said shaft for relative longitudinal and tilting motions, diametrically opposed grooves in said block, a sleeve surrounding said shaft and having knife edged lugs engaged in said grooves to provide a mounting for said block, a coil spring surrounding said shaft and based on said first end plate, said spring acting on said block through said sleeve to press said block toward said second end plate, oppositely disposed cable engaging means on said block extending outside the area defined by said side frames, a pair of control cables being adapted to be passed over the rotatable cable guides supported from said first end plate and into cooperative relation with said cable engaging means on said block, said block acting in response to an inequality of load between said control cables to tilt and become wedged on said shaft whereby to permit said control cables to move around said rotatable guides without being subject to the yield provided by said spring.

WARREN H. CLARK.

REFERENCES CITED

The following references are of record in the file of this patent:

UNITED STATES PATENTS

| Number | Name | Date |
|---|---|---|
| 2,327,021 | Cushman | Aug. 17, 1943 |
| 2,363,228 | Cade | Nov. 21, 1944 |
| 2,363,229 | Cade | Nov. 21, 1944 |
| 2,169,813 | Parker | Aug. 15, 1939 |
| 852,592 | Bauman | May 7, 1907 |